US008134818B2

(12) United States Patent
Alkan et al.

(10) Patent No.: US 8,134,818 B2
(45) Date of Patent: Mar. 13, 2012

(54) QUARTER WAVE STUB SURGE SUPPRESSOR WITH COUPLED PINS

(75) Inventors: Erdogan Alkan, Syracuse, NY (US); Ahmet Burak Olcen, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 779 days.

(21) Appl. No.: 12/099,562

(22) Filed: Apr. 8, 2008

(65) Prior Publication Data

US 2009/0251840 A1 Oct. 8, 2009

(51) Int. Cl.
*H02H 3/22* (2006.01)

(52) U.S. Cl. ......... 361/119; 361/116; 361/117; 361/118

(58) Field of Classification Search .................. 361/116, 361/117, 118, 119
See application file for complete search history.

(56) References Cited

U.S. PATENT DOCUMENTS 2,438,912 A 4/1948 Hansen et al.
3,274,447 A * 9/1966 Nelson .......................... 361/119
3,289,117 A * 11/1966 Kearns et al. ................. 333/206
4,689,713 A 8/1987 Hourtane et al.
4,695,919 A 9/1987 Wendt
4,918,565 A 4/1990 King
5,053,910 A 10/1991 Goldstein
5,083,233 A 1/1992 Kirkby et al.
5,315,684 A 5/1994 Szegda
5,363,060 A 11/1994 Kohno et al.
5,371,819 A 12/1994 Szegda
5,371,821 A 12/1994 Szegda
5,384,429 A 1/1995 Bulson et al.
5,444,810 A 8/1995 Szegda
5,508,873 A 4/1996 Knapp et al.
5,625,521 A 4/1997 Luu et al.
5,692,090 A 11/1997 Szegda
5,726,851 A 3/1998 Knapp
5,751,534 A 5/1998 DeBalko
5,835,326 A 11/1998 Callaway
5,844,766 A 12/1998 Miglioli
5,963,822 A 10/1999 Saihara et al.
6,144,399 A 11/2000 Manchester et al.
6,266,224 B1 7/2001 Lang et al.
6,510,034 B2 1/2003 Palinkas et al.
6,636,407 B1 10/2003 Ryman
6,683,773 B2 1/2004 Montena
6,721,155 B2 4/2004 Ryman
6,791,813 B2 9/2004 Shikano et al.
6,930,872 B2 8/2005 Palinkas et al.

(Continued)

OTHER PUBLICATIONS

PCT/US2009/039833. International Search Report and Written Opinion. Date of Mailing: Nov. 18, 2009. 10 pp.

(Continued)

*Primary Examiner* — Rexford Barnie
*Assistant Examiner* — Angela Brooks
(74) *Attorney, Agent, or Firm* — Schmeiser Olsen & Watts

(57) ABSTRACT

A surge suppressor for protecting electronic equipment by suppressing damaging surges of low frequency signals in a radio frequency (RF) transmission line, while allowing RF signals of a desired frequency range to pass through the transmission line. The surge suppressor can comprise a housing, a center pin connected to a stub, and at least one interface pin conductively coupled to the cable and capacitively coupled to the center pin. The surge suppressor can have a signal pass through bandwidth approximately 10 times exceeding the bandwidth of traditional quarter wavelength stub (QWS) devices, a higher return loss, and higher surge attenuation level. The surge suppressor can be symmetrically insertable into a cable providing an RF communication line.

8 Claims, 6 Drawing Sheets

U.S. PATENT DOCUMENTS

| | | | | |
|---|---|---|---|---|
| 6,944,005 | B2 | 9/2005 | Kooiman | |
| 7,064,623 | B2 | 6/2006 | Yoshida et al. | |
| 7,102,868 | B2 | 9/2006 | Montena | |
| 7,161,785 | B2 | 1/2007 | Chawgo | |
| 7,278,888 | B2 * | 10/2007 | Kim et al. | 439/620.21 |
| 7,316,585 | B2 | 1/2008 | Smith et al. | |
| 7,349,191 | B2 * | 3/2008 | Harwath | 361/117 |
| 2002/0064014 | A1 | 5/2002 | Montena | |
| 2002/0141127 | A1 | 10/2002 | Daugherty | |
| 2004/0057186 | A1 | 3/2004 | Chawgo | |
| 2004/0095703 | A1 | 5/2004 | Montena | |
| 2004/0169986 | A1 | 9/2004 | Kauffman | |
| 2005/0099754 | A1 | 5/2005 | Hazenboom et al. | |
| 2006/0023386 | A1 | 2/2006 | Palinkas et al. | |
| 2006/0061931 | A1 | 3/2006 | Olcen | |
| 2006/0181832 | A1 | 8/2006 | Landinger | |
| 2007/0097583 | A1 | 5/2007 | Harwath | |
| 2007/0165352 | A1 | 7/2007 | Davis et al. | |
| 2008/0062606 | A1 | 3/2008 | Brown et al. | |

OTHER PUBLICATIONS

EP09729810. Supplementary European Search Report. Date of Completion of Search: Mar. 22, 2011. 7 pp.

* cited by examiner

QUARTER WAVE STUB SURGE SUPPRESSOR WITH COUPLED PINS

FIELD OF THE INVENTION

This invention relates generally to surge protectors, and more particularly to quarter wave stub (QWS) surge protectors employed in high-frequency signal transmission lines.

BACKGROUND OF THE INVENTION

In radio frequency (RF) signal transmission lines, typically transmitting electromagnetic signals with the frequencies over 1 MHz, undesirable effects can occur if a strong surge (e.g., caused by lightning) is transmitted to sensitive electronic devices coupled to the transmission line. Lightning can produce strong surge signals ranging in frequency from 0 (direct current) to 1 MHz. Therefore, a surge suppressor should prevent surges of low frequency signals from passing through the transmission line, while allowing the desired RF signals to pass freely.

Surge suppressors insertable into a transmission line in series with the equipment being protected can employ quarter wave stubs (QWS) which are seen as a short circuit to the ground by low frequency signals, while RF signals encounter input impedance corresponding to an open circuit.

Traditional QWS surge suppressors usually have very narrow bandwidth of the RF signals allowed to pass. Besides, the surge signals that can be allowed to pass by the traditional QWS surge suppressors can have energy levels which are dangerous for sensitive electronic equipment connected to the transmission line. Known enhancements intended to improve the bandwidth and the let-through energy usually introduce an element insertable into the communication line in series with the QWS, thus rendering the surge suppressor asymmetrical, i.e., requiring a unidirectional insertion of the modified QWS surge suppressor into the communication line. The asymmetrical insertion requirement can significantly increase the rate of installation errors.

Thus, a need exists for a surge suppressor which has a relatively wide pass through signal bandwidth with a return loss value more than 20 dB, low let-through energy and very high surge attenuation levels for low frequency signals. The need also exists for a surge suppressor which is symmetrically insertable into a communication line.

SUMMARY OF THE INVENTION

It is a primary object of the present invention to provide a device for suppressing surges of low frequency electromagnetic signals in an RF transmission line, while allowing the desired RF signals to pass through.

It is a further object of the present invention to provide a device for suppressing surges of low frequency signals in an RF transmission line with a pass through signal bandwidth exceeding the bandwidth of the devices employing the conventional QWS design.

It is a further object of the present invention to provide a device for suppressing surges of low frequency signals in an RF transmission line with a high passband return loss and a high surge attenuation level.

It is a further object of the present invention to provide a symmetrical device for suppressing surges of low frequency signals in an RF transmission line, which is bi-directionally insertable into the transmission line which can be provided by a coaxial cable.

It is a further object of the present invention to provide a method of designing a surge suppressor possessing the above listed characteristics.

These and other objects of the present invention are attained by a surge suppressor insertable into a cable providing an RF transmission line. The surge suppressor can comprise a housing, a center pin connected to at least one stub, and at least one interface pin which is conductively coupled to the cable and capacitively coupled to the center pin. The surge suppressor can have a bandwidth approximately 10 times exceeding the bandwidth of traditional quarter wave stub (QWS) devices with a high passband return loss. In one embodiment, the surge suppressor can have a symmetrical design and thus be symmetrically insertable into a communication line.

The method of designing the surge suppressor can comprise the steps of specifying one or more design parameters, including a desired center frequency, a type of connector interface, a desired bandwidth, a desired return loss, a desired insertion loss, a desired surge attenuation level, and an allowable arc voltage level between the center pin and the interface pin; calculating the length of the stub; calculating a size of the gap between the center pin and the interface pin; and calculating a diameter of the interface pin.

BRIEF DESCRIPTION OF THE DRAWINGS

For a further understanding of the objects of the invention, reference will be made to the following detailed description of the invention which is to be read in connection with the accompanying drawings, where.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1A:
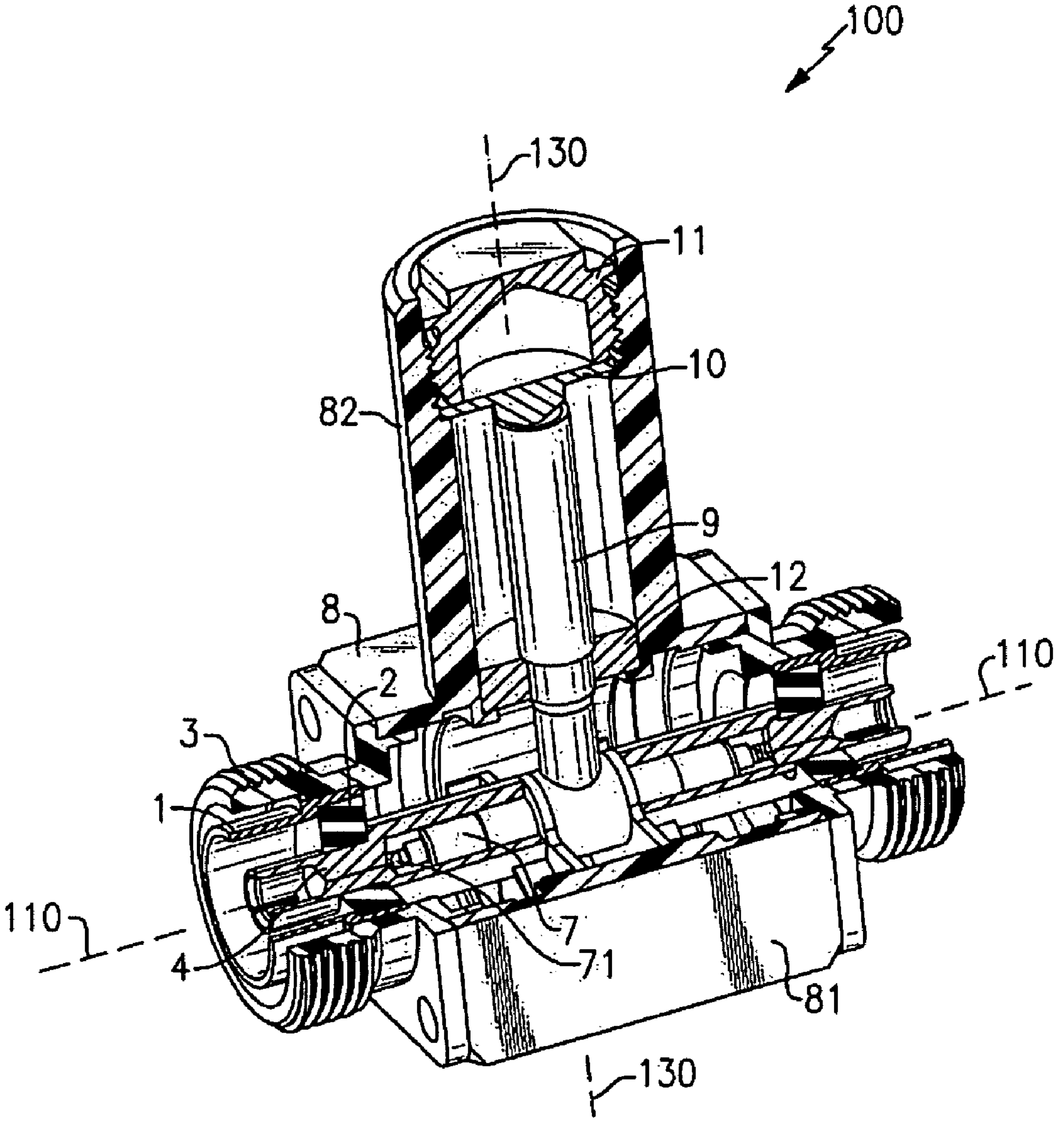
FIGS. 1*a*-1*b* illustrate cutaway and exploded views of one embodiment of the surge suppressor according to the invention.
Figure 1B:
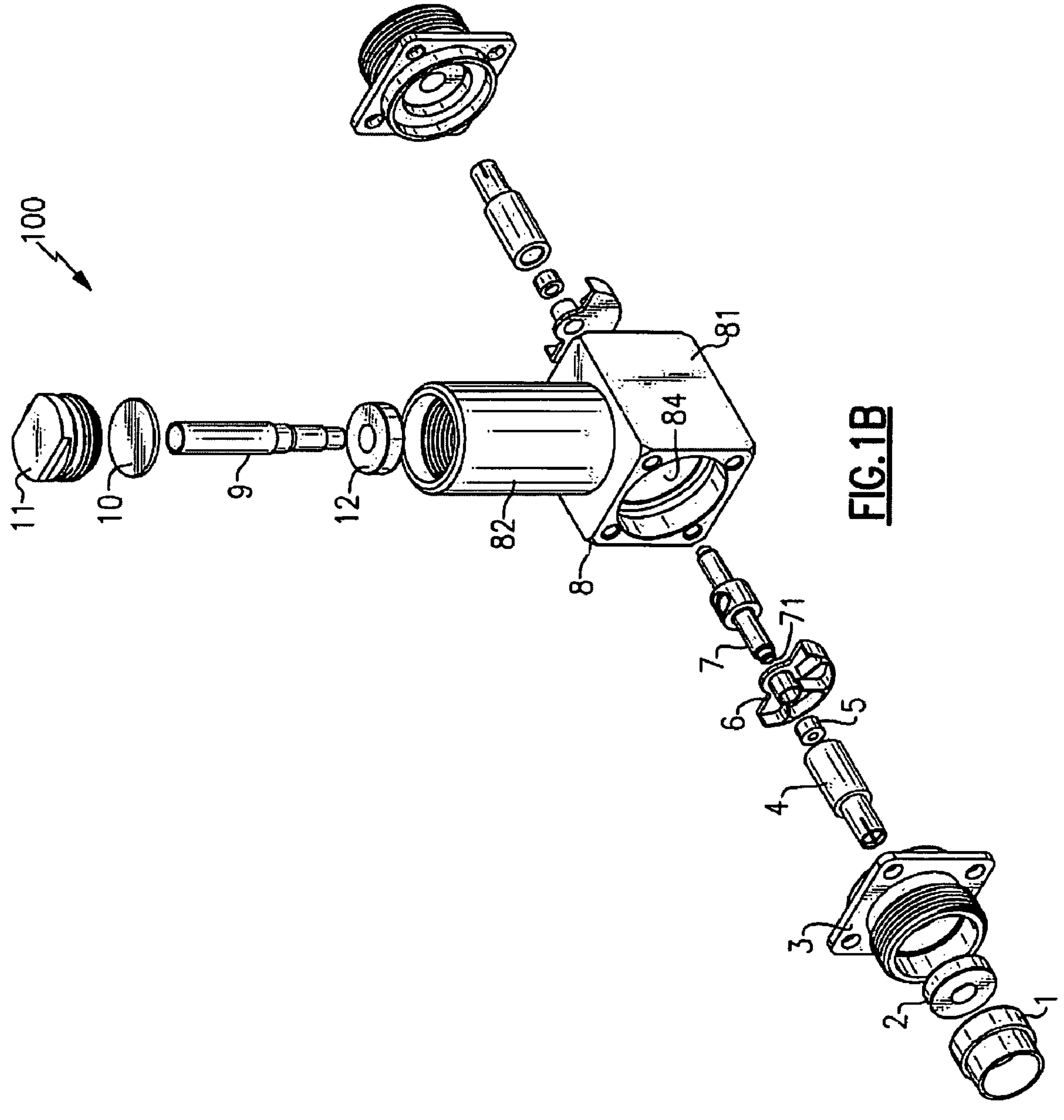
Figure 1C:
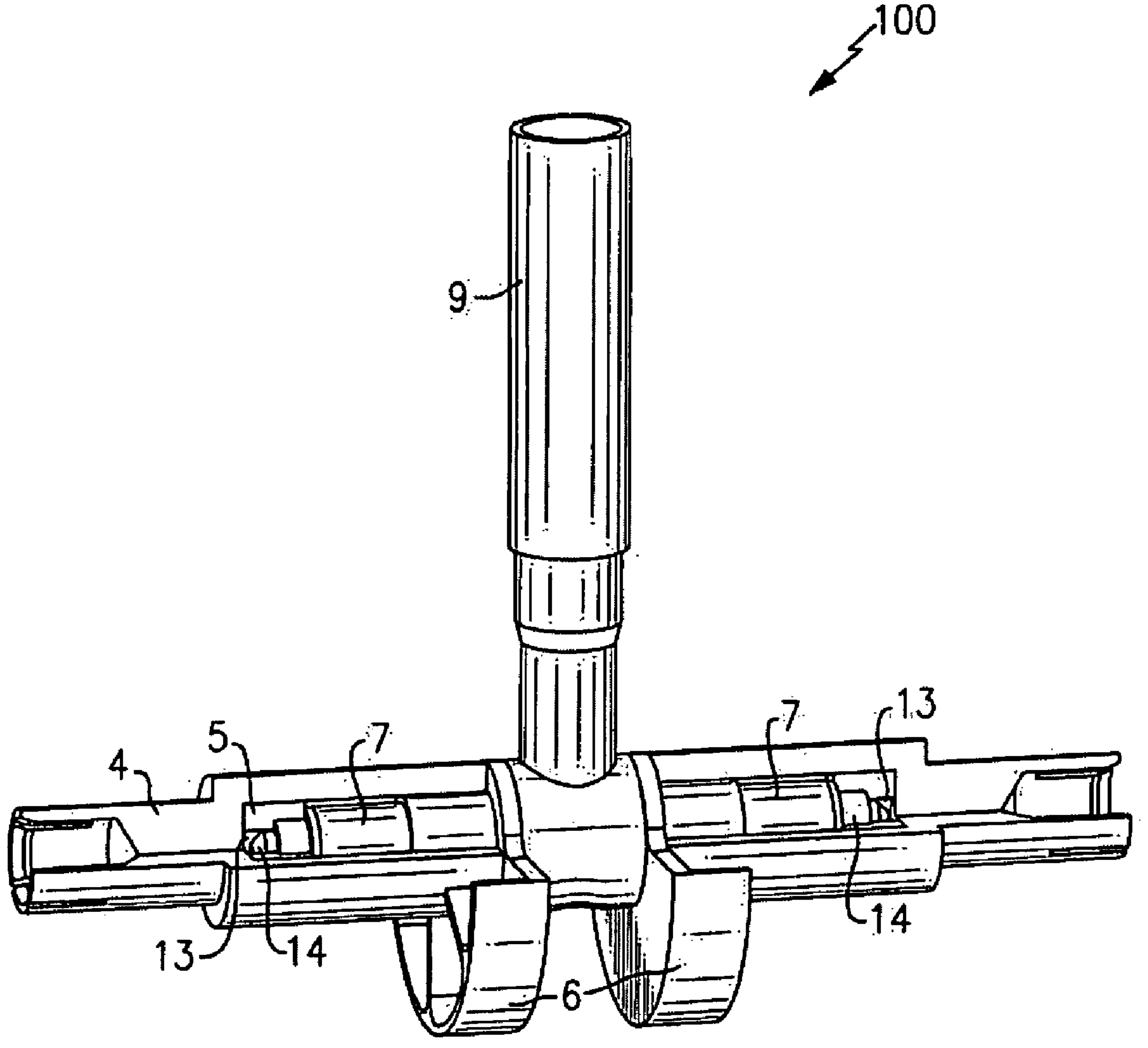
FIG. 1*c* illustrates the surge suppressor according to the embodiment depicted in FIGS. 1*a*-1*b*, with the housing removed.

One embodiment of a surge suppressor in accordance with the present invention is described referencing FIGS. 1*a* and 1*b* which illustrate cutaway and exploded views of a symmetrical single-stub surge suppressor, and FIG. 1*c* which illustrates a cutaway view of the surge suppressor with the housing being removed. A skilled artisan would appreciate the fact that the scope and spirit of the present invention include multi-stub designs of the surge suppressor.

In the embodiment shown in FIGS. 1*a*-1*c*, the surge suppressor 100 extending along a longitudinal axis 110, is generally symmetrical relatively to the vertical axis 130, the latter being the axis of symmetry of the stub 9. The symmetrical design feature allows symmetrical bi-directional insertion of the surge suppressor 100 into a cable that provides the RF signal transmission. The symmetrical design feature further allows showing in the exploded view and describing only one component of each pair of the symmetrical components. A skilled artisan would appreciate the fact that the scope and spirit of the present invention include asymmetrical designs of the surge suppressor.

The surge suppressor 100 can generally comprise a metallic housing 8 which can incorporate most of the components of the surge suppressor. Unless explicitly stated otherwise, the components described herein infra can be made of suitable conductive metallic alloys.

The housing 8 can include a conductor portion 81 and a stub portion 82. The conductor portion 81 of the housing 8 can generally extend along the longitudinal axis 110. The conductor portion 81, as best viewed in FIG. 1*b*, can have a central bore 84 designed to receive components which provide the RF signal transmission, including a center pin 7, at least one support insulator 6, at least one strike insulator 5, at least one interface pin 4, and at least one interface cap 3.

A skilled artisan would appreciate the fact that while FIGS. 1*a*-1*b* show the conductor portion 81 of the housing 8 having a form of a parallelepiped and the central bore 84 having a cylindrical form, the form factors shown do not limit the scope and spirit of the present invention.

The center pin 7 can have an elongated form and extend along the longitudinal axis 110. The center pin 7 can further have an opening for receiving at least one stub 9 so that the stub 9 can be conductively coupled to the center pin 7. In one embodiment, the stub 9 can extend in a direction orthogonal to the longitudinal axis 110.

The center pin 7 can be supported within the central bore 84 by at least one support insulator 6 made of a dielectric material. The form factor of the support insulator 6 can be primarily defined by the form factor of the central bore 84. The support insulator 6 can have a central opening designed to receive one end of the center pin 7.

The center pin 7 can be capacitively coupled to at least one interface pin 4. The interface pin 4 can be conductively coupled to the cable (not shown in FIGS. 1*a*-1*c*) which provides the RF signal transmission. The interface pin 4 can have a form factor which allows the interface pin 4 to act as one plate of an isolation capacitor when being placed in a close physical proximity of one end of the center pin 7, so that the end of the center pin 7 provides a second plate of the isolation capacitor. In one embodiment, the interface pin 4 can have a form of a cylindrical sleeve configured to receive one end of the center pin 7. In another embodiment (not shown), the interface pin 4 can be received within one end of the center pin 7.

In one embodiment, a strike insulator 5 made of a dielectric material can separate one end of the center pin 7 and an interface pins 4 and thus maintain a gap 13 of a pre-defined size (e.g., 0.01") between the center pin 7 and the interface pin 4, so that the interface pin 4 can be capacitively coupled to the center pin 7. The strike insulator 5 can further have an opening around the center pin 7 which in operation will cause an electric arc to jump from a pointed end 71 of the center pin 7 to the interface pin 4. In another embodiment, a support insulator 6 can support center pin 7 within the interface pin 4.

In operation, the gap 13 can effectively prevent low frequency signals (e.g., lightning surges) with the voltage level less than a pre-defined threshold (e.g., 1 kV) from flowing between the center pin and the interface pin 4. Increasing the size of the gap 13 will increase the voltage level of surges that can be blocked by the gap 13. However, the insertion loss of the surge suppressor will increase as the width of the gap increases.

While the low frequency signals are prevented from flowing between the center pin and the interface pin 4, the higher frequency RF signals can flow between the center pin and the interface pin 4, since the center pin 7 is capacitively coupled to the interface pin 4 by an isolation capacitor composed by an end of the center pin 7 and the interface pin 4, as described supra.

The housing 8 can have at least one stub portion 82, which is now being described with references to FIGS. 1*a* and 1*b*. The stub portion 82 can generally extend in a direction orthogonal to the longitudinal axis 110. Located within the stub portion 82 can be a stub 9, a stub contact 10, a stub cap 11, and a stub insulator 12. Stub cap 11 can be threadably attached to the stub portion 82, as best viewed in FIG. 1*a*. A skilled artisan would appreciate the fact that any other suitable means of attaching the stub cap to the stub portion of the housing can be employed. A skilled artisan would further appreciate the fact that while FIGS. 1*a*-1*b* show the stub portion 82 of the housing 8 having a cylindrical form, the form factor shown does not limits the scope and spirit of the present invention. Stub cap 11 can maintain the stub contact 10 firmly pressed against the stub 9, while the stub insulator 12 can be inserted between the stub contact 10 and stub 9, as best viewed in FIG. 1*a*. The stub insulator 12 can have a form factor configured to support and align the stub 9. A skilled artisan would appreciate the fact that while FIGS. 1*a*-1*b* show the stub insulator 12 having an annular form, the form factor shown does not limit the scope and spirit of the present invention.

The stub 9 can provide a short circuit to the ground for low frequency signals while deflecting the RF signals. The frequency range of the RF signals which would be deflected by the stub depends upon the impedance of the stub 9, which in turn depends upon the length of the stub 9.

Figure 2:
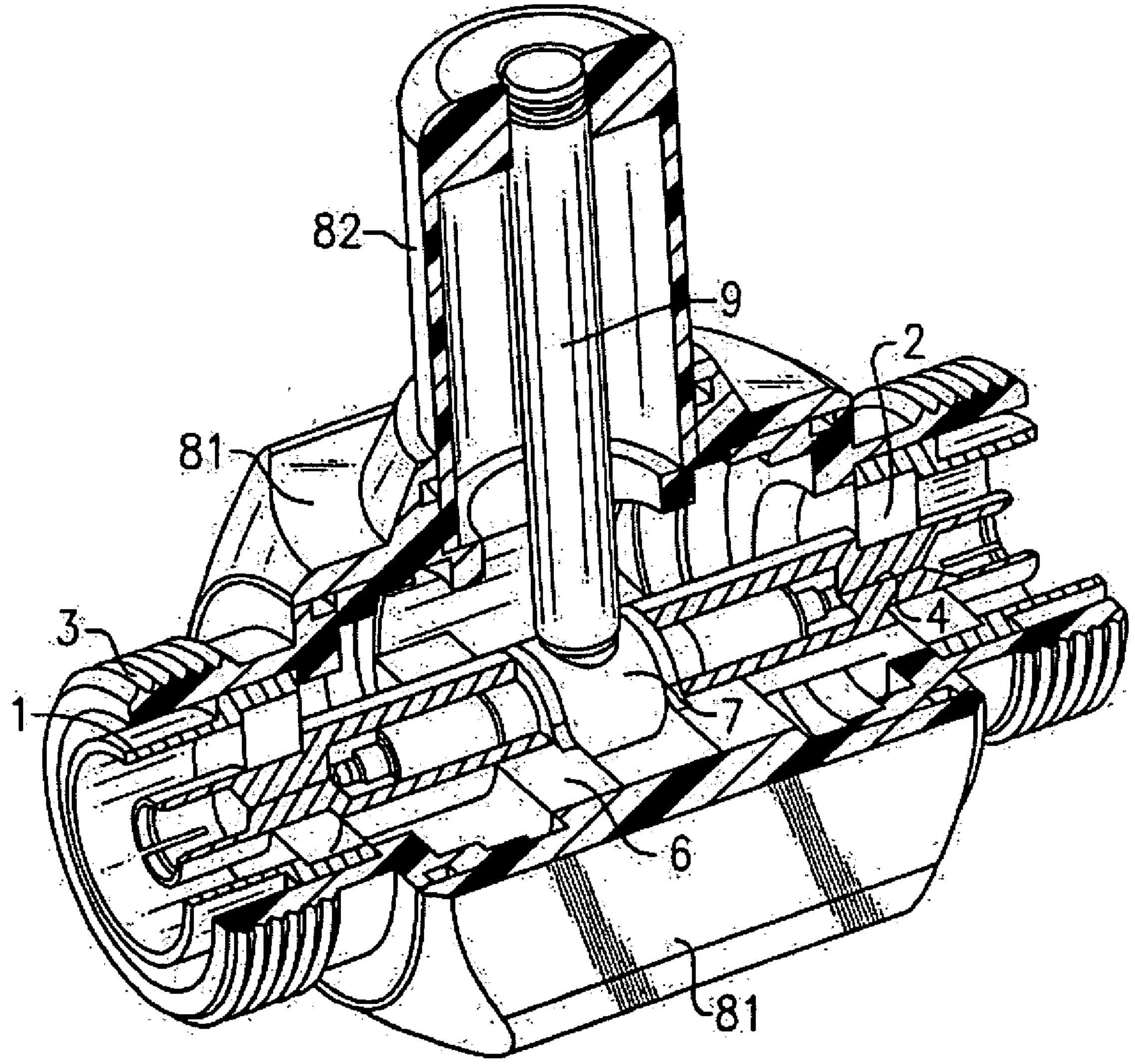
FIG. 2 illustrates a cutaway view of another embodiment of the surge suppressor according to the invention.

In another embodiment, illustrated in FIG. 2, the stub portion 82 of the housing can be combined with the stub cap 11 of FIG. 1*a* into a single part. A skilled artisan would appreciate the fact that other designs of the stub portion of the housing are within the scope and the spirit of the present invention.

Referring again to the conductor portion 81 of the housing best viewed in FIGS. 1*a* and 1*b*, at least one interface cap 3 can be received at one end of the conductor portion 81 of the housing. The interface cap 3 can be fastened to the conductor portion 81 of the housing. A skilled artisan would appreciate the fact that any other suitable means of attaching the interface cap to the conductor portion of the housing can be employed. The interface cap 3 can have a form factor matching the form factor of the central bore 84. A skilled artisan would also appreciate the fact that while FIGS. 1*a*-1*b* show the central bore 84 and the interface cap 3 having a cylindrical form, the form factor shown does not limit the scope and spirit of the present invention.

The interface cap 3 can be configured to receive a specific cable interface type. A skilled artisan would appreciate the fact that while FIG. 1 shows the interface cap 3 suitable to receive a typical 50 Ohm coaxial cable connector (not shown in FIG. 1), the interface cap 3 can be designed to be suitable to receive other types of cable interfaces.

At least one interface cap insulator 2 can support the interface pin 4 in the coaxial position. The interface cap insulator 2 can be made of a dielectric material and have a form factor conforming to the form of the interface cap 3. A skilled artisan would also appreciate the fact that while FIG. 1 shows the cap insulator 2 having an annular form, the form factor shown does not limits the scope and spirit of the present invention.

At least one interface ground contact 1 can provide the ground continuity with the cable received by the interface cap 3. The interface ground contact 1 can have a form factor conforming to the form of the interface cap 3.

Figure 3A:
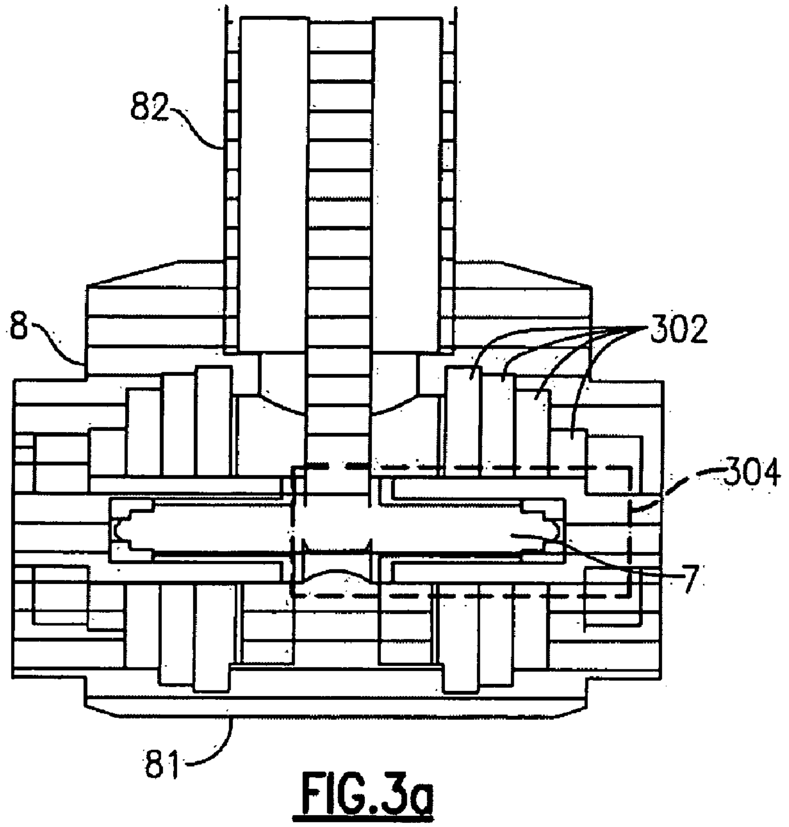
FIG. 3*a* illustrates a cutaway view of an embodiment of the surge suppressor with diameter steps for the impedance matching according to the invention.

To provide for a desired level of return loss (e.g., better than 25 dB), the surge suppressor can be matched to the line impedance at both interfaces. To achieve this, several diameter steps 302 can be provided on the stub 9, the center pin 7, and on the inside wall of the housing 8 as shown in FIG. 3*a*, thus providing return loss of 25 dB over a broad frequency band (e.g., between 600 MHz and 2500 MHz.)

Figure 3B:
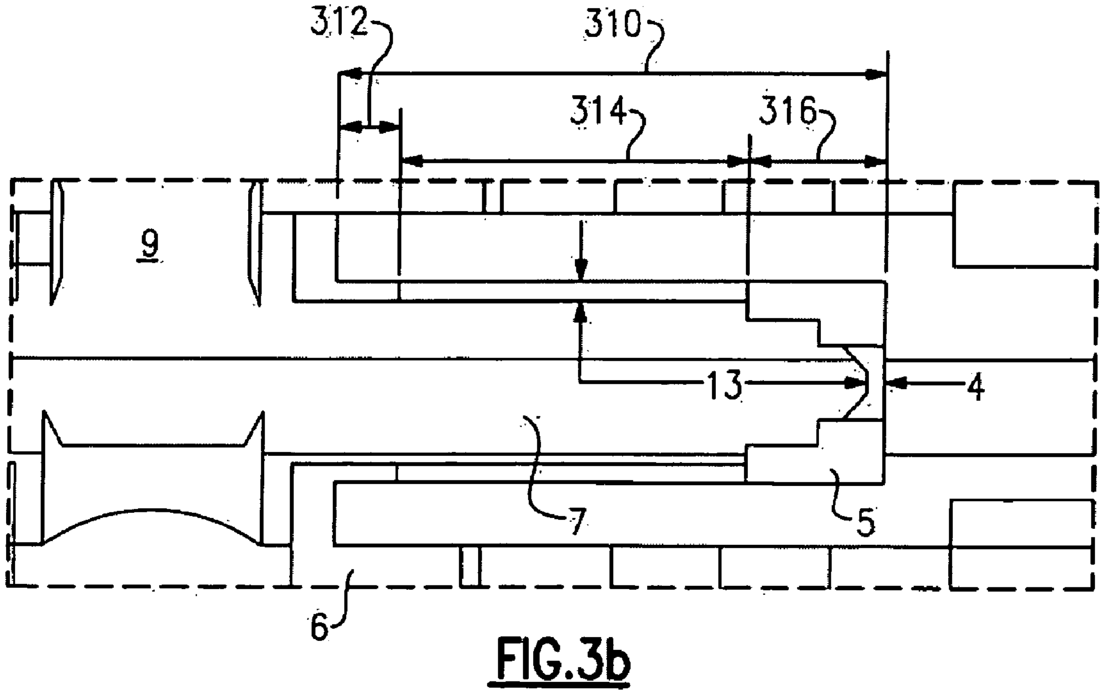
FIG. 3*b* illustrates a zoomed-in cutaway view of coupled pins according to the invention.

In operation, the low frequency signal surges that are of higher voltage levels than the gap 13 can block will cause an electric arc to jump from an interface pin 4 to the pointed end 71 of the center pin 7. This surge will then be diverted to the ground by the stub 9, since the stub 9 is seen as a short circuit to the ground by low frequency signals, while the desired RF signals encounter input impedance corresponding to an open circuit. Thus, the energy surges having a voltage lower than the design voltage level will never hit the protected RF equipment. The frequency range of desired RF signals deflected by the stub 9 is determined by the length of the stub 9 and the length of the coupled section of the center pin 7, as shown in FIG. 3*b*. FIG. 3*b* illustrates the fragment 304 of FIG. 3*a* being zoomed-in to show a cutaway view of one embodiment of coupling the interface pin 4 and the center pin 7. The interface pin 4 having a form of a cylindrical sleeve can be configured to receive one end of the center pin 7, with the gap 13 between the pins being maintained by the support insulator 6 and the strike insulator 5. The desired bandwidth of the surge suppressor, exceeding the bandwidth of the traditional QWS design by 10 times or more, can be achieved by adjusting the design parameters, e.g., the length of the coupled section 310, including the width 312 of the support insulator 6, the size 314 of the gap 13, and the width 316 of the strike insulator 5.

Figure 4:
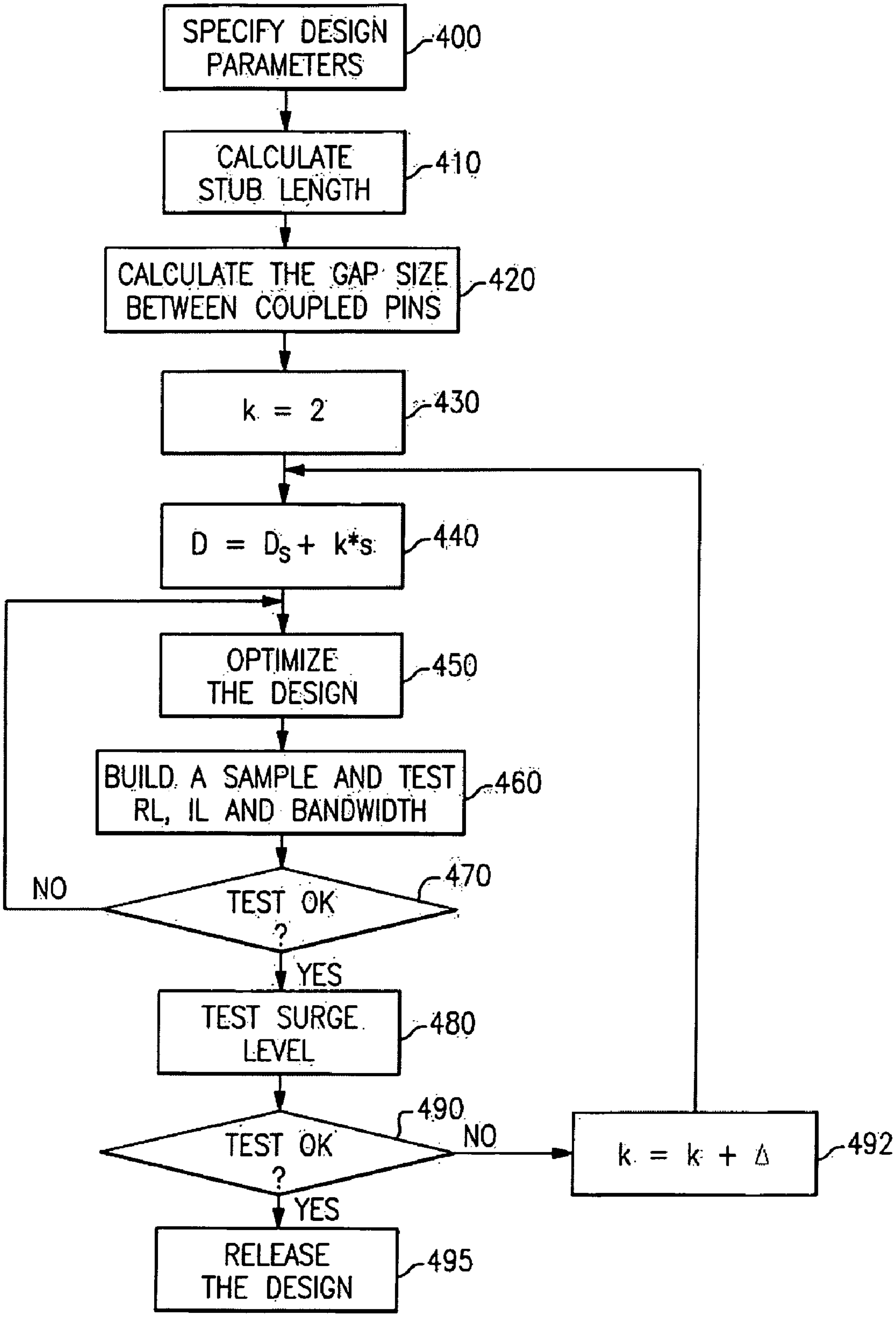
FIG. 4 illustrates a flow chart of a process of designing a QWS surge suppressor with coupled pins according to the invention.

The process of designing a QWS surge suppressor with coupled pins according to the invention is now described with references to the flowchart illustrated in FIG. 4.

At step 400, the design parameters are specified. In one embodiment, the design parameters can include one or more of the following parameters: the desired center frequency, the type of connector interface, the desired bandwidth, the desired return loss, the desired insertion loss, the desired surge protection voltage level, and the allowable arc voltage level between the coupled pins.

At step 410, the stub length is calculated. In one embodiment, the stub length can be calculated as being equal to one-fourth of the wave length of the signal transmission line at the specified center frequency. In another embodiment, the stub length can be calculated as being equal to one-fourth of the wave length of the signal transmission line at the specified center frequency, further divided by a square root from the value of the permittivity of the material of the stub insulator 12 of FIG. 1*b*.

For example, for a center frequency value of 2 GHz and the permittivity of the insulating material value of 4, the full wave length will be $$\lambda = c/((2*10^9)*4^{1/2}) = 3*10^8/((2*10^9)*4^{1/2}) = 0.075 \text{ m},$$

wherein c is the speed of light in vacuum;

and the stub length will be equal to $\lambda/4=0.01875$ m.

At step 420, the size of the gap 13 of FIG. 3*b* between the coupled pins is calculated. In one embodiment, the size of the gap between the coupled pins can be calculated by dividing the allowable arc voltage level between the coupled pins by the breakdown voltage level of the material of the strike insulator 5 of FIG. 1*b*. For example, for an allowable arc voltage level of 1200V and the breakdown voltage level of 60 kV/inch, the size of the gap between the coupled pins will be 1200/60K=0.02".

At step 430, the multiplier k of the gap size is initialized with the value of 2.

At step 440, the diameter of the interface pin is calculated. In one embodiment, the diameter can be calculated based on the following equation:

$$D = D_s + k*S, \text{ wherein}$$

D is the interface pin diameter;

$D_s$ is the standard pin diameter for the specified type of connector interface;

S is the size of the gap 13 of FIG. 3*b* between the coupled pins; and k is a real number which must be greater than or equal 2.

At step 450, the design can be optimized, e.g., using simulation software. In one embodiment, the design can be optimized by adding additional impedance matching elements to meet the insertion loss and return loss specifications.

At step 460, a sample surge suppressor is made and one or more of the values of return loss, insertion loss and bandwidth are tested.

At step 470, one or more values measured on a sample surge suppressor during the testing are compared to the values specified at step 400. If the specifications are not met, the method loops back to step 450; otherwise, the processing continues at step 480.

At step 480, the value of surge level is tested on the sample surge suppressor, by measuring, e.g., the throughput voltage or the let-through energy.

At step 490, the value of the surge level measured on the sample surge suppressor is compared to the value specified at step 400. If the specification is not met, the method branches to step 492; otherwise the method terminates at step 495.

At step 492, the value of the gap size multiplier k is incremented by a pre-defined value of Δ, and the method loops back to step 440. In one embodiment, the value of Δ can be a real number from the range of [0.01; 1].

At step 495, the design of the surge suppressor is complete, and the method terminates.

While the present invention has been particularly shown and described with reference to the preferred mode as illustrated in the drawings, it will be understood by one skilled in the art that various changes in detail may be effected therein without departing from the spirit and scope of the invention as defined by the claims.

The invention claimed is:

1. A surge suppressor for protecting electronic equipment by suppressing surges of low frequency electromagnetic signals in a radio frequency (RF) transmission line while allowing RF signals of a desired frequency range to pass through said transmission line, said transmission line being provided by a cable, said surge suppressor comprising:

a center pin having a length, a longitudinal axis, and at least one end providing a first plate of an isolation capacitor;

at least one interface pin conductively coupled to a segment of said cable and capacitively coupled to said center pin, said at least one interface pin providing a second plate of said isolation capacitor;

at least one stub having a length, said at least one stub providing a short circuit for diverting said surges of low frequency signals to a ground; and a housing incorporating said center pin, said at least one stub, and said at least one interface pin;

wherein said desired frequency range depends upon said stub length and said center pin length.

2. The surge suppressor of claim 1, wherein said center pin has a cylindrical form and extends along said longitudinal axis;

wherein said longitudinal axis extends in the direction of RF signal conduction along said transmission line;

wherein said at least one interface pin has a form factor selected from the group consisting of: a cylindrical sleeve configured to receive one end of said center pin and a cylindrical sleeve configured to be received within one end of said center pin; and wherein a gap is maintained between said one end of said center pin and said at least one interface pin by at least one insulator.

3. The surge suppressor of claim 1, wherein said at least one stub extends in a direction orthogonal to said longitudinal axis of said center pin.

4. The surge suppressor of claim 1, wherein said surge suppressor has two interface pins, each of said two interface pins providing bi-directional transmission of said RF signals between said center pin and said cable; and wherein said surge suppressor is configured to be symmetrically bi-directionally insertable into said cable in series with said electronic equipment.

5. The surge suppressor of claim 1 further comprising at least one interface cap attached to said housing and having an opening for receiving said at least one interface pin, said at least one interface cap configured to receive a cable connector.

6. The surge suppressor of claim 1 further comprising:

at least one interface cap attached to said housing and having an opening for receiving said at least one interface pin, said at least one interface cap configured to receive a cable connector;

at least one interface ground contact attached to said at least one interface cap and configured to provide ground continuity with said cable; and at least one interface cap insulator made of a dielectric material and having a form factor suitable to support said at least one interface pin in a coaxial position, said at least one interface cap insulator inserted between said at least one interface ground contact and said at least one interface cap.

7. The surge suppressor of claim 1 further comprising at least one support insulator having a form factor suitable to support said at least one interface pin within at least one end of said center pin.

8. The surge suppressor of claim 1, wherein said stub further includes a stub contact, a stub insulator having a form factor configured to support and align said stub, and a stub cap, said stub cap configured to be detachably attached to said housing, said stub cap further configured to maintain said stub contact firmly pressed against said stub, said stub contact being inserted between said stub cap and said stub.

* * * * *